Nov. 17, 1936.  S. I. MOLICKI  2,060,946
AIRCRAFT
Filed Dec. 20, 1935
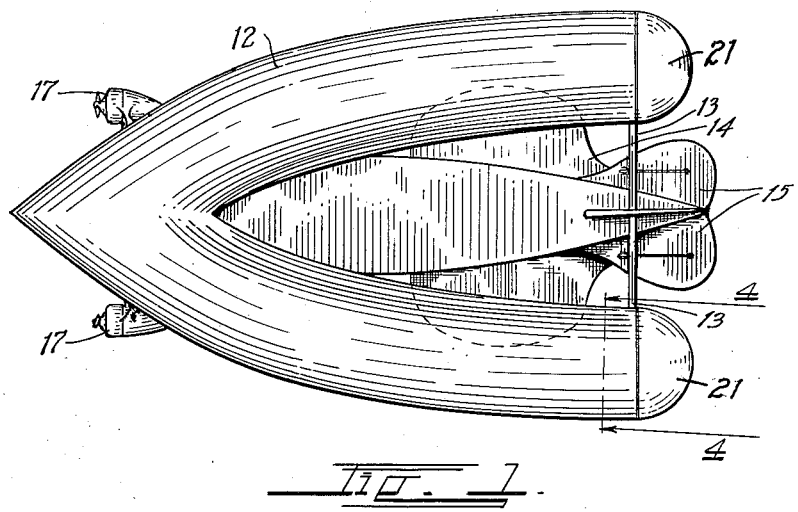
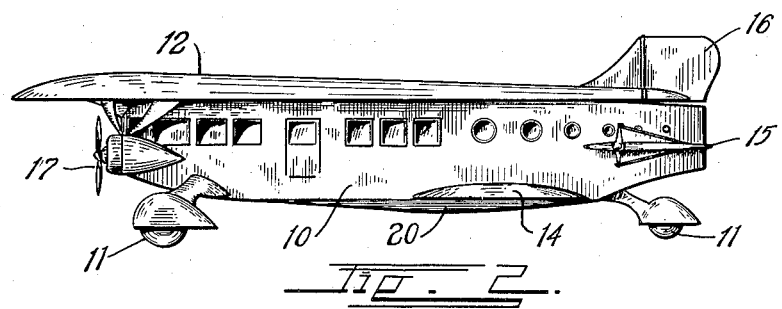
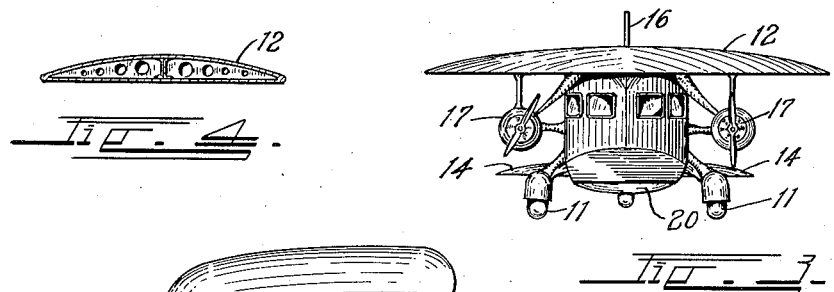
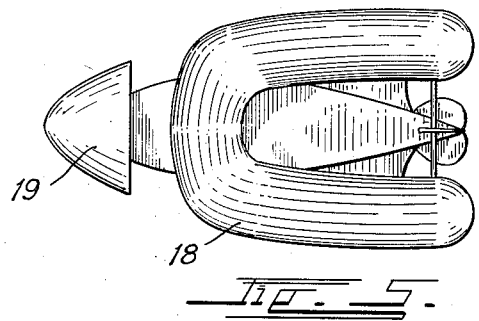
INVENTOR.
SEVERYN I. MOLICKI
BY
ATTORNEY.

Patented Nov. 17, 1936

2,060,946

UNITED STATES PATENT OFFICE 2,060,946

AIRCRAFT

Severyn I. Molicki, Denver, Colo.

Application December 20, 1935, Serial No. 55,399

1 Claim. (Cl. 244—12)

This invention relates to an airplane and has for its principal object the provision of a wing arrangement and a wing design which will give higher efficiency, greater stability, and better gliding qualities than possessed by present aircraft.

Another object of the invention is to provide a plane and wing design which will have less head resistance than the present types.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a plan view of an airplane in which the invention has been embodied.

Fig. 2 is a side view thereof.

Fig. 3 is a front view thereof.

Fig. 4 is a detail cross section through the upper wing, taken on the line 4—4, Fig. 1.

Fig. 5 illustrates an alternate form of wing arrangement.

The invention comprises a stream lined fuselage 10 provided with suitable landing wheels 11. A V-shaped upper wing 12 is supported above the fuselage 10 with its apex directed forwardly and with its bifurcated rear extending oppositely outward on each side of the fuselage 10. The separated rear portions of the wing 12 are braced and supported from the fuselage by means of suitable struts 13. The leading and trailing edges of the upper wings extend outwardly and rearwardly on gradual arcs from the apex to the rear edges.

It is desired to call particular attention to the particular shape of the wing 12. The rear portions separate from each other at a comparatively sharp or pointed angle at the front and thence curve on gradually lessening angles as the rear is approached until they approach almost a parallel position to each other at the tail surfaces. This wing shape creates a substantially uniform lift throughout the entire length of the fuselage; relieves the weight on the tail control surfaces; and provides a maximum wing area with a minimum of beam or width. It also reduces the drag produced by the usual long leading edge which in the usual construction is headed directly against the air flow and not at a gradual angle as is the wing in this application.

Toward the rear of the fuselage 10 and adjacent the bottom thereof, a lower stabilizing wing 14 projects outwardly from each side. The rear of the fuselage is provided with control surfaces, such as the elevators 15 and rudder 16. It is preferred to place the elevators 15 at each side of the pointed rear extremity of the fuselage 10 and to place the rudder 16 above the rear extremity of the fuselage.

The wings 12 and 13 may have any desired airfoil shape. It is preferred however, to give the wing 12 an airfoil shape of the type shown in Fig. 4, that is, with a relatively thick mid-section and with relatively narrow rounded edge sections, the bottom surface being flat.

Models of this plane have demonstrated it to have excellent gliding qualities. Therefore it would make an ideal glider or trailer to be towed by a power plane. However, power could be applied to the present plane by any of the usual means. As illustrated, a pair of tractor propellers 17 have been mounted at each side of the fuselage adjacent the apex of the upper wing 12.

The unusually excellent gliding angle is believed to be mainly due to the curvated, V-shape of the upper wing which positions the rear portion well to each side of the fuselage to give stability and balance, and positions a wide lifting surface adjacent the front of the fuselage to increase support and decrease the gliding angle.

In Fig. 5, I have illustrated a slightly alternate form of the invention in which an upper wing 18 having a U-shape replaces the wing 12. The wing 18 curves across the fuselage intermediate the extremities of the latter and extends rearwardly in two trailing ends. A smaller triangular wing 19 is placed forward of the fuselage, its edges being in alignment with the leading edges of the wing 18. This form is similar to the form of Fig. 1, except that the upper wing has been separated, the apex comprising the forward triangular portion 19 and the rearward separated portions being joined to the rear of the apex.

Models built according to this form also have very stable efficient properties.

It is preferred to form the fuselage 10 with a projecting keel 20 which appears to give it greater stability in the air and also serves as a landing surface for alighting upon water. If the fuselage is made water tight the ship can alight directly upon water.

For lateral leveling and balancing the rearward extremities of the upper wing may be provided with controllable aileron tips 21.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:—

An airplane comprising: a fuselage; tail control surfaces on the rearward extremity of said fuselage; a V-shaped upper wing positioned above said fuselage with its apex extending forwardly of the latter; and side portions of uniform width extending rearwardly from said apex, said side portions being continuously curved in plan and extending first outwardly and rearwardly from said apex, thence gradually lessening their outward angle on a gradual curve until they approach a parallel position as the rear of said fuselage is approached to a termination at each side of and above said tail control surfaces.

SEVERYN I. MOLICKI.